March 21, 1950      T. C. GOWER      2,501,170
AUTOMATIC ELEVATOR
Filed Feb. 26, 1946      3 Sheets-Sheet 1
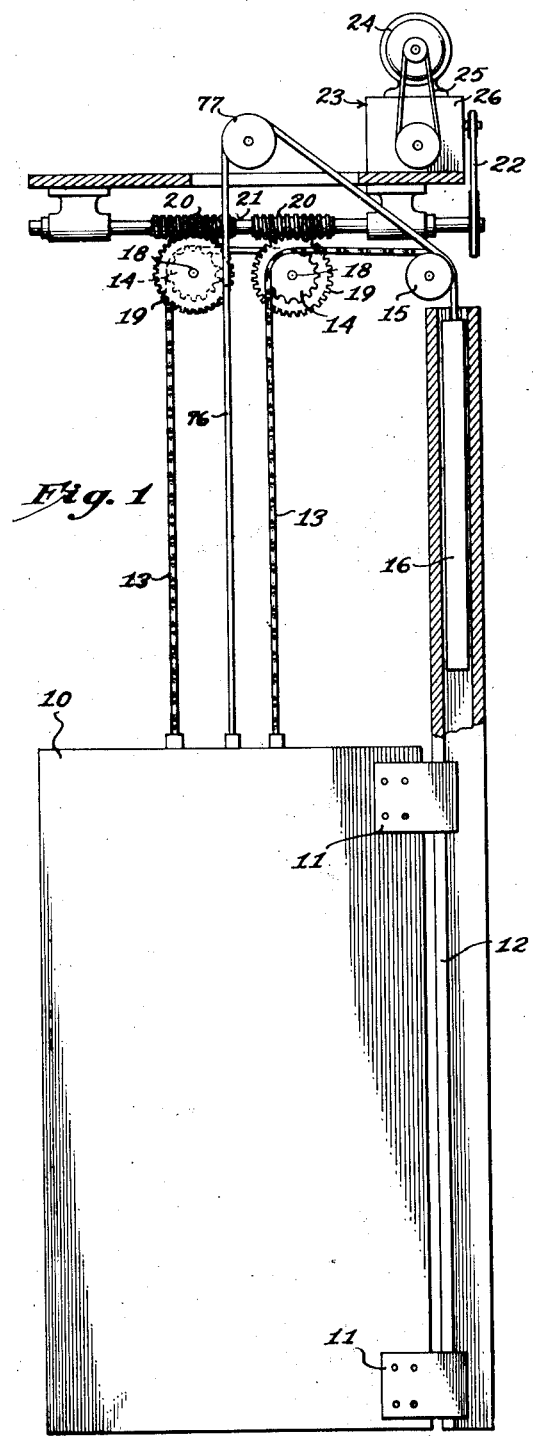
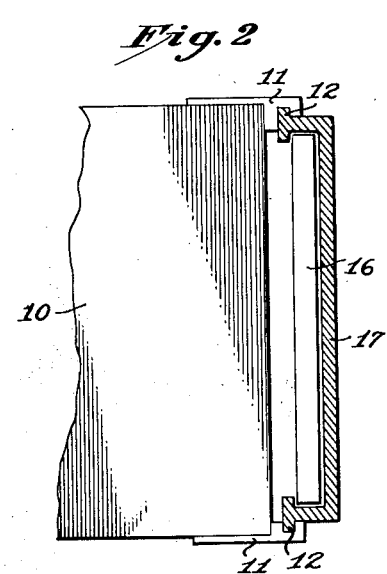
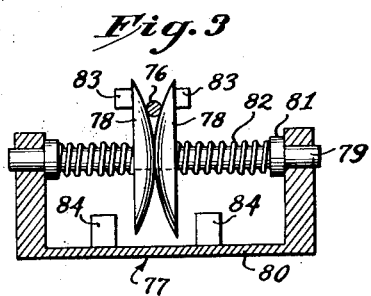
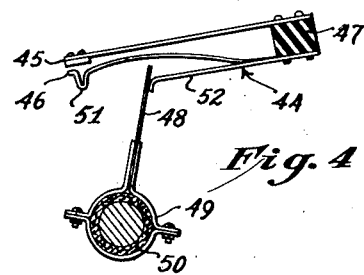
INVENTOR.
T. CHARLES GOWER
BY Harley L. Parrott,
attorney

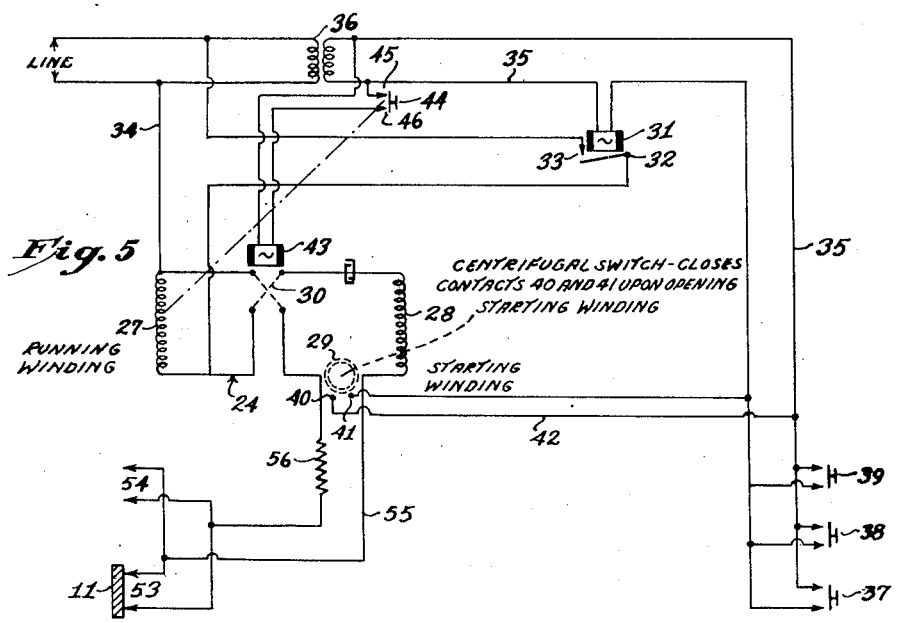
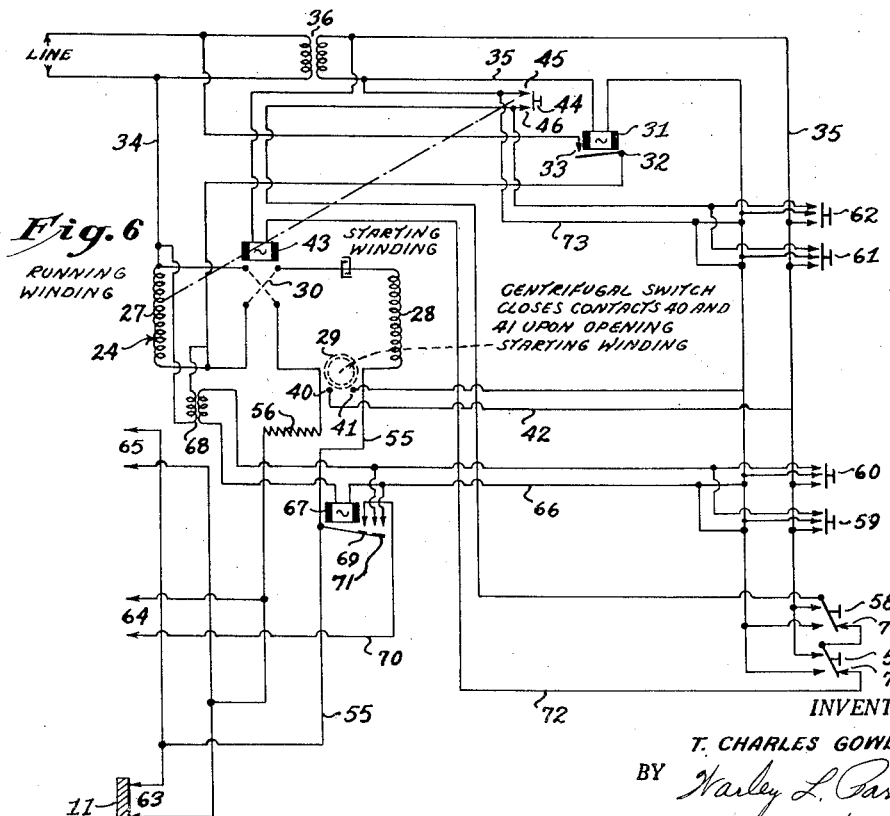

March 21, 1950 T. C. GOWER 2,501,170
AUTOMATIC ELEVATOR
Filed Feb. 26, 1946 3 Sheets-Sheet 3
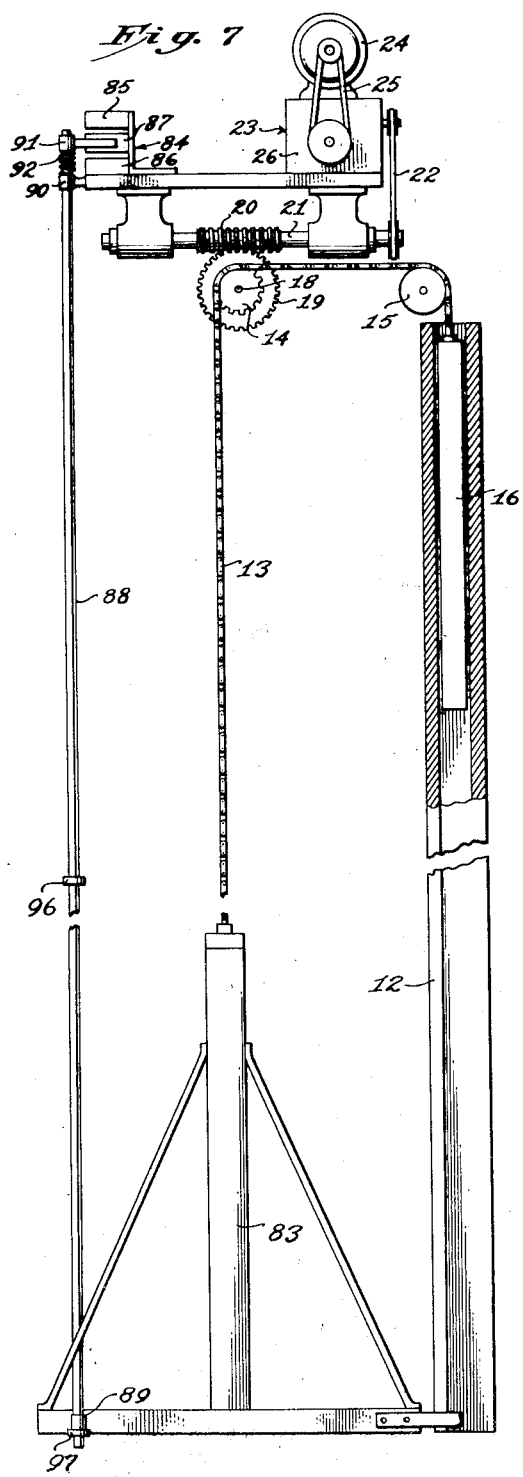
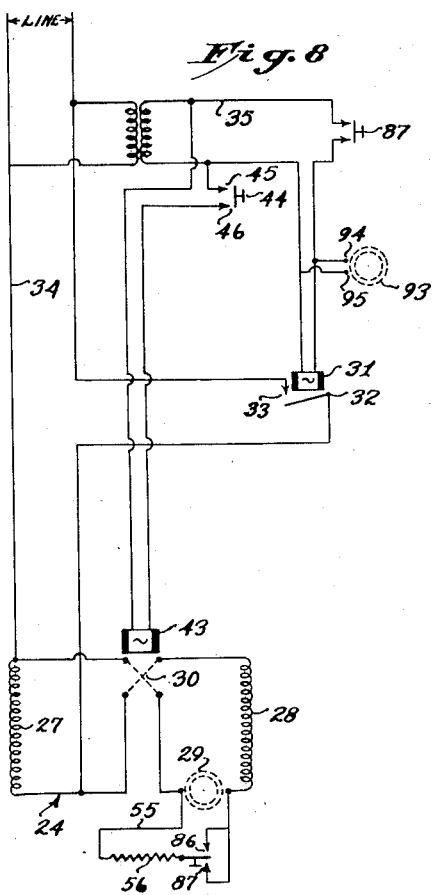
INVENTOR.
T. CHARLES GOWER
BY Harley L. Parrott,
attorney Patented Mar. 21, 1950

2,501,170

UNITED STATES PATENT OFFICE 2,501,170

AUTOMATIC ELEVATOR

Thomas Charles Gower, Greenville, S. C.

Application February 26, 1946, Serial No. 650,252

8 Claims. (Cl. 187—29)

1

This invention relates to automatic elevators, and to motor control systems for such elevators.

One of the principal commercial problems encountered in the manufacture of automatic elevators is the relatively costly control systems which have heretofore been required. This is particularly true of automatic elevators intended for domestic use, for the usual type of motor control system renders the total cost of a domestic installation prohibitive in all but exceptional cases.

According to the present invention I have deviser a motor control system for automatic elevators which adapts standard and relatively inexpensive electrical equipment to use for this purpose so as to provide a serviceable and practical motor control system at greatly reduced cost. This invention utilizes the basic principles of the invention disclosed in my copending application, Serial No. 594,623, filed May 19, 1945, now U. S. Patent No. 2,425,312, granted August 12, 1947.

In the above identified copending application I have disclosed a motor control system for controlling the motion and direction of rotation of a single phase electric motor so as to adapt the motor particularly for operation of a door closure. In the present case, the motor control system of my earlier invention is modified and improved so as to adapt it for operation of automatic elevators as mentioned above.

Generally described, the present invention comprises an automatic elevator arranged for operation by a single phase electric motor, particularly a capacitor motor, having a starting winding and associated means for automatically disconnecting the starting winding after the motor has started. An elevator car is disposed in any usual manner for travel between floor levels, and a motor control system is provided to effect operation of the above mentioned electric motor so as to cause travel of the elevator car between floor levels as desired. Control stations are arranged on the elevator car and on each of the floor levels served so that the elevator can be put in motion from any of these control stations. After the elevator has been put in motion in this manner, and the motor starting winding has been automatically disconnected as mentioned above, the motor control system of the present invention is arranged to effect a reversal of the connections for the starting winding automatically and when the elevator car reaches the floor level to which it is traveling a circuit is established to reconnect the reversed starting winding of the motor so as

2 to oppose the direction of operation of the motor and stop it.

This arrangement of the automatic elevator and motor control system of the present invention is illustrated in the accompanying drawing in which:

Fig. 1 is an elevation, mainly diagrammatic, of an automatic elevator incorporating the features of the present invention;

Fig. 2 is a corresponding plan view;

Fig. 3 is a detail of a safety lock for use with the automatic elevator of the present invention;

Fig. 4 is a detail of the means employed for effecting reversal of starting winding;

Fig. 5 is a circuit diagram illustrating the arrangement of the motor control system of the present invention as incorporated in an automatic elevator adapted to serve two floor levels;

Fig. 6 is a similar circuit diagram for an automatic elevator adapted to serve three floor levels;

Fig. 7 is an elevation mainly diagrammatic illustrating an adaptation of the automatic elevator of the present invention as a hoist; and, Fig. 8 is a circuit diagram illustrating the arrangement of a motor control system according to the present invention for operation of the hoist shown in Fig. 7.

As illustrated in Figs. 1 and 2, the automatic elevator of the present invention comprises an elevator car 10 disposed by means of shoes 11 for travel between floor levels on vertical guide ways 12. The car 10 is operated on the guide ways 12 by means of sprocket chains, or the like, 13 attached to the top of the car and extended upward over driven sprocket wheels 14 and an idler pulley 15 to a counterweight 16. The guide ways 12 for the car 10 may be formed as part of a frame structure 17 which may also serve as a housing for the counterweight 16 (see Fig. 2). The driven sprocket wheels 14 are fixed on shafts 18 together with worm wheels 19 which engage worms 20 carried by a shaft 21 having a driving connection as indicated at 22 with a motor unit 23.

The motor unit 23 suitably comprises a single phase electric motor 24, such as a capacitor motor as mentioned above, connected as at 25 through a speed reduction box 26 to the driving connection 22. Motion of the motor 24 when in operation will accordingly be transferred to the shaft 21 to drive the worm wheels 19 through worms 20, and cause car 10 to travel on guide ways 12 as this motion is transferred to sprocket chains 13 through driven sprocket wheels 14.

The manner in which the motor 24 is connected for operation of car 10 as an automatic elevator is illustrated by the circuit diagrams in Figs. 5 and 6, an arrangement for two floor levels being shown in Fig. 5, and for three floor levels in Fig. 6. Referring first to Fig. 5, the running winding of motor 24 is indicated at 27 and the starting winding at 28. The circuit for the starting winding 28 includes a centrifugal switch, as indicated at 29, and a reversing switch 30. A relay 31 is arranged to control normally open contacts 32 and 33 in a line circuit 34 running to motor 24. This relay 31 is connected in series in a low voltage control circuit at 35, suitably of the order of 24 volts, running from a transformer 36 arranged across the line circuit 34. The control circuit 35 also includes push button control stations, or the like, arranged in parallel as at 37, 38 and 39. Where the automatic elevator is adapted for operation between two floor levels only three of these control stations are required, the control station 37, for example, being located on the first floor, the control station 38 on the car, and the control station 39 on the second floor level.

With the arrangement just described, actuation of any of the push buttons 37, 38, or 39 will close control circuit 35 so as to actuate relay 31, with the result that contacts 32 and 33 will be closed and line circuit 34 will be completed to start motor 24 and cause movement of elevator car 10. After motor 24 has been started in this manner centrifugal switch 29 will operate to disconnect starting winding 28, and as this happens auxiliary contacts 40 and 41, positioned to be made by centrifugal switch 29 in running position, will be closed to complete an auxiliary circuit 42 across control circuit 35. The purpose of this auxiliary circuit 42 is to maintain control circuit 35 closed across relay 31, and thus maintain the line circuit 34 across motor 24 during operation. With this arrangement it is only necessary to close one of the control stations 37, 38, or 39 momentarily to start operation of motor 24, and centrifugal switch 29 will then close contacts 40 and 41 to maintain control circuit 35 closed through auxiliary circuit 42.

In the usual case, the conventional centrifugal switch 29 incorporated in capacitor motors or the like will operate rapidly enough to accomplish this result satisfactorily. Where it is found, however, that the centrifugal switch for the motor is not sufficiently responsive, a second centrifugal switch, as described below in connection with Fig. 8, may be arranged for operation at an increased speed by a belt connection or the like from the motor pulley shaft so as to close contacts 40 and 41 at a desired interval before centrifugal switch 29 shifts to running position to disconnect starting winding 28.

After the motor 24 has been started as just described, and the starting winding 28 has been disconnected by centrifugal switch 29, the reversing switch 30 is actuated through relay 43 to reverse the connections of starting winding 28. Relay 43 is connected across control circuit 35 through a control in the nature of a push button as indicated at 44. The arrangement of this control 44 is illustrated in Fig. 4, and includes two contacts 45 and 46 extending more or less in the form of leaf springs from a suitably insulated mounting as indicated at 47. An operating arm 48 is arranged in relation to these contacts 45 and 46 from a mounting on a friction collar 49 which may be carried on an operating shaft of motor unit 23, or on a special timer shaft (not shown) if desired. The friction collar 56 is fitted with a lining of friction material 50, and fitted tightly enough to rotate with the shaft on which it is carried when not opposed.

Starting with contacts 45 and 46 open as shown in Fig. 4, operating arm 48 will accordingly rotate with counter-clockwise rotation of the shaft on which it is carried to force contacts 45 and 46 to a closed position, at which point it will be restrained by a stop 51 formed in contact 46 so that friction collar 49 will then slip with continued rotation in the same direction of the shaft on which it is mounted. Reverse rotation of this shaft will cause operating arm 48 to move in the other direction so as to allow contacts 45 and 46 to spring apart, the operating arm 48 being restrained after this has happened by a stop arm 52 which may be mounted to extend from the previously mentioned mounting 47. Reference is made to my above mentioned copending application for a further disclosure of the arrangement of a control of this type. By arranging control 44 on a shaft having suitable speed relations to the shaft of motor 24, the timing for making and breaking contacts 45 and 46, and correspondingly reversing the connections of starting winding 28, can be easily arranged to occur after starting winding 28 has been disconnected by centrifugal switch 29 upon starting of the motor 24.

Motor 24 will continue to operate after it has been started to move the elevator car 10 from one floor level to another, but as the starting winding 28 will have been reversed, reconnection of the starting winding will result in opposing the direction of rotation of the motor 24 and stopping it. Means for reconnecting the starting winding 28 are provided through pairs of stopping contacts 53 and 54 which may be arranged on guide ways 12 in any suitable manner to be closed when the car 10 reaches the floor level to which it is traveling by one or both of the shoes 11 on car 10.

The pairs of stopping contacts 53 and 54 are arranged in parallel in a circuit 55 which bridges centrifugal switch 29 so that when car 10 reaches the floor level toward which it is traveling and one of the pairs of contacts 53 and 54 is made, the circuit 55 will be closed to bridge out the centrifugal switch 29 and reconnect starting winding 28, which as previously mentioned has been reversed. A suitable resistance element 56 may be placed in circuit 55 to cushion the load on starting winding 28 when it is reconnected in this manner.

As the starting winding 28 under these conditions will oppose the running winding 27 of motor 24, the motor will be slowed down; and as motor 24 comes to a stop, auxiliary circuit 42 will be opened at contacts 40 and 41, because centrifugal switch 29 will shift back to its original position as motor 24 loses speed. Opening of auxiliary circuit 42 in this manner will also open control circuit 35 so that relay 31 will be de-energized and the line circuit 34 to motor 24 will be opened at contacts 32 and 33 to stop motor 24. Elevator car 10 will accordingly be stopped at the floor level toward which it was traveling.

It will be noticed, however, that the starting winding 28 will have been reversed to effect the stopping, and that with this reversed connection of starting winding 28 the motor 24 will operate to cause car 10 to travel to the other floor level when motor 24 is again placed in motion. By this arrangement the car 10 can be caused to travel from either of the floor levels to the other by actuating the push button control 37 or 39 at the other floor level or the push button control 38 on the car. The bridging circuit 55 will not prevent car 10 from moving away from a floor level when motor 24 is started because shoe 11 will move off of the corresponding pair of contacts 53 or 54 to open circuit 55 before centrifugal switch 29 shifts to disconnect starting winding 28 and reversing switch 30 is actuated to reverse the connections.

The arrangement of my motor control system for three floor levels, as illustrated in Fig. 6, differs from the arrangement just described for two floor levels in that: a push button control station for each floor is provided on the elevator car 10; an auxiliary relay circuit is included to bring into play the stopping contacts on guide way 12 at the second floor level; and the control circuit 35 is otherwise conditioned to insure a proper direction of rotation for motor 24 in effecting travel of car 10 from either the first or third floor levels.

The push button control station at the first floor level is indicated in Fig. 6 at 57, and the first floor push button control on the car 10 at 58. Similarly, the push button control at the second floor level and on the car for the second floor are indicated at 59 and 60, and for the third floor level and on the car for the third floor at 61 and 62. The stopping contacts disposed on guide way 12 to be made by the shoe 11 on car 10 and are indicated for the floor level at 63, for the second floor level at 64, and for the third floor level at 65.

The auxiliary relay circuit to bring into play the second floor stopping contacts 64 is shown at 66 in Fig. 6, and includes relay 67 and transformer 68 through which it is connected across line circuit 34. The relay 67 is arranged in relation to contacts as indicated at 69 to connect a circuit 70, running to the second floor contacts 64, across circuit 55 which runs to the first and third floor stopping contacts 63 and 65 arranged in parallel in the same manner as the stopping contacts 53 and 54 shown in Fig. 5. When relay 67 is energized the contacts at 69 are made to complete circuit 70 so that stopping contacts 64 are rendered operative to stop car 10 at the second floor level. Normally, relay 67 is de-energized so that circuit 70 is open, but when either the push button control 59 at the second floor level or the push button 60 on the car 10 for the second floor are closed to start motor 24 through control circuit 35, relay circuit 66 is simultaneously closed so that relay 67 is energized to make the contacts at 69. When these contacts at 69 are made to complete the circuit indicated at 70 to the pair of stopping contacts 64 at the second floor level, auxiliary contacts as indicated at 71 are also made by relay 67 to form holding connections across control circuit 66 and thus maintain relay 67 energized after either of the push buttons 59 or 60 are released following actuation to operate car 10 in relation to the second floor. This arrangement provides the necessary connections to bridge centrifugal switch 29 through stopping contacts 64 when it is desired to stop car 10 at the second floor level, but renders the second floor stopping contacts 64 normally inactive so that the car 10 may otherwise be caused to travel freely between the first and third floor levels.

In order to condition the control circuit from the push button controls at the first and third floor levels so that the motor 24 will always have the proper direction of rotation when it is started to cause the car 10 to travel from either of these floor levels, the circuit to the reversing relay 43 is connected to include these push button controls through the connections indicated generally at 72 and 73. These circuits 72 and 73 are arranged so that the push button controls at the first and third floor levels will either always break or always make the circuit energizing the reversing relay 43, and motor 24 will accordingly always be actuated for operation in the proper direction at these floor levels.

An arrangement of this sort is necessary in order to obtain automatic operation for three floor levels. If, for example, car 10 were called from the first floor level by actuation of either of the push button controls for the second floor level, the motor 24 would operate as previously described to cause car 10 to travel from the first floor level to the second floor level. When the second floor level was reached the shoe 11 would make contacts 64 at this point and stop motor 24 by reconnecting to starting winding 28 which would have been reversed after the motor 24 started to move car 10 from the first floor level. With car 10 stopped at the second floor level in this manner, it will be recognized that because the connections of starting winding 28 were reversed to effect stopping at the second floor level, actuation of the push button controls at either the first or third floor levels would cause car 10 to return to the first floor level unless some provision were made for conditioning the control circuits otherwise.

The arrangement shown in Fig. 6 for conditioning the control circuit for reversing relay 43 so as to avoid this result disposes the push button controls 57 at the first floor level and 58 on the car for the first floor level so that whenever either of these controls is actuated to start motor 24 the control circuit running to reversing relay 43 will be opened. As a result the reversing switch 30 will always assume a position corresponding to de-energized condition of relay 43 before motor 24 starts to cause car 10 to travel from the first floor level. Similarly, the push button controls 61 at the third floor level and 62 on the car for the third floor are connected to make the circuit to reversing relay 43 and always energize this relay when either of these push buttons are actuated, so that reversing switch 30 will always assume a position corresponding to energized condition of relay 43 when these push button controls are actuated to cause car 10 to travel from the third floor level. With this arrangement it will of course be necessary to orient the operation of the control 44, as noted further below, to actuate reversing relay 43 so that starting winding 28 will always be reversed after motor 24 has been started to cause car 10 to travel from either the first floor or third floor levels.

The push button controls 57 and 58 at the first floor level are of the combination make and break type, and they are arranged so that a contact 74 associated with push button control 57, and contact 75 associated with push button control 58, are normally made; and these contacts 74 and 75 are connected in series so that the circuit 72 is normally completed through these contacts. Whenever either of the push button controls 57 or 58 at the first floor level is actuated, however, the corresponding contact 74 or 75 is opened so that circuit 72 is opened, and the circuit to reversing relay 43 is maintained open with the result that motor 24 is started for operation with the starting winding 28 connected through reversing switch 30 positioned in accordance with de-energized condition of reversing relay 43. After either of the push button controls 57 or 58 has been energized to start motor 24, the control will return to normal position to make the contact 74 or 75 as the case may be, and again complete circuit 72 so that the position of reversing switch 30 after motor 24 has started will be controlled by the operation of control 44. Control 44 would in this case be arranged for operation to make the contacts 45 and 46 after motor 24 has been started to move car 10 from the first floor level, and the starting winding 28 would accordingly be reversed as previously described for reconnection to stop motor 24 when it reaches the floor level toward which it is traveling.

The push button controls 61 on the third floor level and 62 on the elevator car for the third floor are arranged similarly to make the circuit to reversing relay 43 whenever they are actuated to start motor 24 for operation of car 10 from the third floor. These push button controls 61 and 62 may be of the ordinary make type, and are connected in parallel across control circuit 35, and in parallel in circuit 73. Circuit 73 in turn runs to a connection in parallel with control 44. As a result, actuation of either of the push button controls 61 and 62 will always close the circuit running to the reversing switch 43 at the same time that they close control circuit 35 to start motor 24; and motor 24 will accordingly always be started through push button controls 61 or 62 with the starting winding 28 connected through reversing switch 30 in accordance with energized condition of reversing relay 43. Motor 24 will thus always be started for operation from the third floor level in a direction opposite to that in which it is started from the first floor level. After actuation of either of the push button controls 61 or 62, they will return to their normally open position so that circuit 73 will be opened. Control 44 would be operated in this case to open contacts 45 and 46 after motor 24 has been started to cause car 10 to travel from the third floor level, and the circuit to reversing relay 43 will consequently be opened after motor 24 has started so that starting winding 28 will be reversed to condition it for reconnection to stop motor 24 when car 10 reaches the floor level toward which it is traveling.

A further feature of the automatic elevator of the present invention is a safety lock for locking the elevator car 10 against movement in the event of a structural failure which would allow the car to drop. For this purpose, a cable 76 is arranged to run from a point of attachment on car 10 over a normally idle pulley unit 77 to counterweight 16. This cable 76 is arranged so that it carries no appreciable load during normal operation of the elevator, and as car 10 moves up and down the cable 76 merely moves over the pulley unit 77. As shown more in detail in Fig. 3, however, the pulley unit 77 is arranged to lock whenever a load is placed on cable 76 as would occur in the event of a structural failure which would allow car 10 to drop.

The pulley unit 77 comprises a pair of pulley flanges 78. These pulley flanges 78 are carried on a shaft 79 which is journaled for rotation in a suitable bracket 80, and is fitted with collars 81 arranged on the shaft 79 adjacent the upstanding support portions of bracket 80. Between these collars 81 and the pulley flanges 78 compression springs 82 are arranged to force the pulley flanges 78 normally in abutting position, and these springs 82 are provided in sufficient strength to hold the pulley flanges 78 in abutting position under the normal load exerted on cable 76 so that a pulley channel is formed for receiving cable 76 as mentioned above. But if an appreciable load is placed on cable 76, as would be the case if car 10 started to drop due to a structural failure, the increased load on cable 76 will part the pulley flanges 78 against the force of springs 82 so that they will be shifted outward on shaft 79, and in this position ears 83 secured on the pulley flanges 78 as shown in Fig. 3 will lock with stops 84 secured on bracket 80 to restrain rotation of the pulley flanges. As this happens, the cable 76 will work down between pulley flanges 78 so that it will be gripped in wedging engagement to lock car 10 effectively against movement and hold it until adequate steps can be taken to deal with the structural failure.

The further embodiment of the present invention shown in Figs. 7 and 8 illustrates an adaptation of the invention as a hoist for use in construction work or the like. In this embodiment a hoist platform 83 is used in place of the elevator car 10 but otherwise the arrangement is generally similar to that described above, the hoist platform 83 being disposed by means of shoes 11 for travel between upper and lower levels on vertical guide ways 12. A sprocket chain 13 as before is attached to the top of the hoist platform 83 and extended upward over a driven sprocket wheel 14 and an idler pulley 15 to a counterweight 16. The driven sprocket wheel 14 is associated on shaft 18 with worm wheel 19 which engages worm 20 on shaft 21 having a driving connection as at 22 with motor unit 23 which includes motor 24 and speed reduction box 26 connected as at 25.

The manner in which motor 24 is connected for operation according to the presently described embodiment of my invention is illustrated by the circuit diagram in Fig. 8. As shown in Fig. 8, the motor 24 includes running winding 27 and starting winding 28, and is connected in a line circuit 34. The circuit for the starting winding 28 includes centrifugal switch 29 and reversing switch 30, and the position of reversing switch 30 is controlled through relay 43 operated from control 44 at contacts 45 and 46.

The principal difference in the connection for motor 24 in this instance consists in modified arrangement for energizing relay 31 to close contacts 33 and 32 in line circuit 34, and for bridging centrifugal switch 29 when it is desired to reconnect winding 28 after reversal to stop motor 24. Instead of the various control stations employed according to the previously described embodiment, only one control station is provided in the present instance. This control station consists of a group of three push button controls or the like arranged as indicated generally at 84 in Fig. 7. Two of these controls 85 and 86 are vertically spaced as shown, while the third push button control 87 is spaced intermediately to one side.

A shaft 88 is disposed to extend vertically for the full length of travel of hoist platform 83 and is positioned slidingly in collars located on the hoist platform 83 as at 89, and on any suitable support associated with the operating unit 23 as at 90. The shaft 88 extends above the collar 90 to carry an extending arm 91, and a spring 92 is received on shaft 88 above collar 90 to support extending arm 91 in an intermediate position between push button controls 85 and 86 and hold it away from push button control 87 by torsional force. As the shaft 88 is slidingly received in collars 89 and 90 it may be turned when desired against the torsional force of spring 92 to cause extending arm 91 to operate push button control 87 which as shown in Fig. 8 is connected to close control circuit 35 and thus energize relay 31 so as to complete line circuit 34 at contacts 32 and 33 to start motor 24.

The use of an auxiliary centrifugal switch as previously suggested to maintain line circuit 34 closed after motor 24 has started is illustrated in Fig. 8 at 93. Centrifugal switch 93 is arranged to make contacts 95 and 94 in running position and thus maintain control circuit 35 closed after momentary actuation of push button control 87. The advantage of using an auxiliary centrifugal switch 93 as indicated is that it may be arranged through a suitably adjusted driving connection (not shown) from motor 24 to operate at an increased speed and accordingly shift to running position to maintain the control circuit 35 closed more rapidly than would be possible with the centrifugal switch 29.

As previously mentioned the reversing switch 30 is shifted by means of relay 43 to reverse the connections of starting winding 28 after motor 24 has started so that starting winding 28 is conditioned for reconnection to stop motor 24 when the level toward which hoist platform 83 is traveling has been reached. Reconnection of the starting winding 28 after reversal for this purpose is accomplished through the vertically spaced controls 85 and 86 mentioned above. The contacts of these controls are normally maintained in open position, and extending arm 91 is normally positioned by spring 92 intermediate these controls. When the hoist platform 83 is caused to travel between its operating levels by starting motor 24, the collar 89 carried by platform 83 will slide on shaft 88. Adjustable collars 96 and 97 are fitted on shaft 88 in accordance with the upper and lower operating levels for the hoist platform 83 so that sliding collar 89 will engage these collars and shift the shaft 88 vertically when either of the operating levels is reached. This shift of the shaft 88 will cause extending arm 81 to actuate one of the push button controls 85 or 86 and in either case as shown in Fig. 8 this actuation will complete circuit 55 to bridge centrifugal switch 29 and reconnect the reversed starting winding 28 to stop motor 24.

A particularly advantageous feature of this arrangement is that while stopping of the hoist platform 83 at the upper and lower operating levels may be obtained automatically, it will also be apparent that the hoist platform 83 may also be stopped and started at any point between these operating levels by manually shifting the shaft 88 so as to make the appropriate control at control station 84. This feature results in great flexibility of operation.

Another important feature of automatic elevators constructed in accordance with the present invention is that the control system is not harmed by stalling the elevator car. If, for example, some part of the operating mechanism should become jammed so as to stall the elevator car and overload motor 24, the only result would be to slow down motor 24 until it stopped just as stopping is normally effected when the starting winding is reconnected in reverse.

The present invention has been described above in terms of the usual types of equipment which would ordinarily be selected for the uses described. It will be apparent that substitutions may be made in the equipment described for purposes of illustration without departing from the basic principles of the invention, and such substitutions are contemplated by the appended claims.

I claim:

1. A motor control system comprising a capacitor motor of the type equipped with a centrifugal switch for automatically disconnecting the starting winding of said motor after the motor has started, a line circuit to said motor, means for closing said line circuit to start said motor, a holding circuit for said line circuit automatically closed by said centrifugal switch upon disconnection of said starting winding, means actuated by rotation of said motor for automatically reversing the starting winding after said motor has started, and means applied automatically after a given period of rotation of said motor for bridging said centrifugal switch to reconnect said reversed starting winding to stop said motor and open said line circuit.

2. A motor control system comprising a single phase electric motor, a line circuit running to said motor and means for closing said line circuit to start the motor, a starting winding circuit for said motor including a speed responsive switch for automatically disconnecting said starting winding after the motor starts, a holding circuit for said line circuit automatically closed by said speed responsive switch upon disconnection of said starting winding means actuated by rotation of said motor for automatically reversing said starting winding after disconnection upon starting of the motor, and means applied automatically after a given period of rotation of said motor for reconnecting said starting winding after reversal to stop said motor and open said line circuit.

3. A motor control system comprising a single phase electric motor having a centrifugal switch arranged to disconnect the starting winding of said motor automatically after the motor has started, a line circuit running to said motor, means for closing said line circuit to start said motor, means associated with said centrifugal switch for automatically maintaining said line circuit closed after the motor starts, a reversing switch arranged in the circuit of said starting winding and means operated by rotation of said motor for automatically actuating said reversing switch to reverse said starting winding after disconnection upon starting of said motor, and means applied automatically after a given period of rotation of said motor for reconnecting said starting winding after reversal to stop said motor and open said line circuit.

4. A motor control system comprising a single phase electric motor having a centrifugal switch arranged to disconnect the starting winding of said motor automatically after the motor has started, a line circuit running to said motor, said line circuit including normally open contacts, a relay arranged to control said contacts, means for energizing said relay to close said contacts and complete said line circuit to start said motor, a holding circuit closed by said centrifugal switch after disconnection of said starting winding for automatically maintaining said line circuit closed after said motor starts, a reversing switch arranged in the circuit of said starting winding, a second relay arranged to control said reversing switch and associated means actuated by rotation of said motor for automatically energizing and deenergizing said second relay to actuate said reversing switch in relation to the direction of rotation of said motor and reverse said starting winding after disconnection upon starting of said motor, and means applied automatically after a given period of rotation of said motor for reconnecting said starting winding after reversal to stop said motor and open said line circuit.

5. An automatic elevator comprising an elevator car disposed for travel between floor levels, and means for causing said elevator car to travel between floor levels comprising a capacitor motor of the type equipped with a centrifugal switch for automatically disconnecting the starting winding of said motor after the motor has started, a line circuit to said motor, means located on said elevator car and at each floor level for closing said line circuit to start said motor, a holding circuit for said line circuit automatically closed by said centrifugal switch upon disconnection of said starting winding means actuated by rotation of said motor for automatically reversing the starting winding after said motor has started, and means applied automatically when the elevator car reaches the floor level to which it is traveling bridging said centrifugal switch to reconnect said reversed starting winding to stop said motor and open said line circuit.

6. An automatic elevator comprising an elevator car disposed for travel between two floor levels, and means for causing said elevator car to travel between said floor levels comprising a single phase electric motor having a centrifugal switch arranged to disconnect the starting winding of said motor automatically after the motor has started, a line circuit running to said motor, said line circuit including normally open contacts, a relay arranged to control said contacts, means located on said elevator car and at each of said floor levels for energizing said relay to close said contacts and complete said line circuit to start said motor and cause said elevator car to move from one floor level to another, means associated with said centrifugal switch for automatically maintaining said line circuit closed after the motor starts, a reversing switch arranged in the circuit of said starting winding, a second relay arranged to control said reversing switch and associated means operated by rotation of said motor for automatically energizing and deenergizing said second relay to actuate said reversing switch in relation to the direction of rotation of said motor and reverse said starting winding after disconnection upon starting of said motor, a bridging circuit across said centrifugal switch, and means applied automatically when the elevator car reaches the floor level to which it is traveling for closing said bridging circuit across said centrifugal switch to reconnect said reversed starting winding to stop the motor and open the line circuit.

7. An automatic elevator comprising an elevator car disposed for travel between three floor levels, and means for causing said elevator car to travel selectively between said floor levels comprising a single phase electric motor having a centrifugal switch arranged to disconnect the starting winding of said motor automatically after the motor has started, a line circuit running to said motor, said line circuit including normally open contacts, a relay arranged to control said contacts, means located on said elevator car and at each of said floor levels for energizing said relay to close said contacts and complete said line circuit to start said motor and cause said elevator car to travel from one floor level to another, means associated with said centrifugal switch for automatically maintaining said line circuit closed upon disconnection of said starting winding after the motor starts, a reversing switch arranged in the circuit of said starting winding, a second relay arranged to control said reversing switch, means actuated by said means located on said elevator car and at each of said floor levels for energizing and deenergizing said second relay to position said reversing switch in accordance with the proper direction of travel of said elevator car from the first and third floor levels, and associated means operated by rotation of said motor for automatically energizing and deenergizing said second relay to actuate said reversing switch in relation to the direction of rotation of said motor and reverse said starting winding after disconnection upon starting of said motor, and means at the first and third floor levels and similar means selectively operable at the second floor level applied automatically for bridging said centrifugal switch to reconnect said reversed starting winding to stop the motor and open the line circuit when the elevator car reaches the floor level to which it is traveling.

8. An automatic elevator comprising an elevator car disposed for travel between upper and lower levels, and means for causing said elevator car to travel between said levels comprising a single phase electric motor having a centrifugal switch arranged to disconnect the starting winding of said motor automatically after the motor has started, a line circuit running to said motor, means for closing said line circuit to start said motor and cause said elevator car to travel from one level to another, means operated by rotation of said motor for reversing the starting winding after disconnection by said centrifugal switch upon starting of said motor, and means for reconnecting said reversed starting winding to stop said motor and open said line circuit, said last mentioned means being automatically operable when the elevator car reaches the level to which it is traveling and manually operable at any intermediate point.

THOMAS CHARLES GOWER.

REFERENCES CITED

The following references are of record in the file of this patent:

UNITED STATES PATENTS

| Number | Name | Date |
|---|---|---|
| 667,430 | Dubinski | Feb. 5, 1901 |
| 683,689 | Ihlder | Oct. 1, 1901 |
| 1,023,857 | Lathrop et al. | Apr. 23, 1912 |
| 1,165,929 | Zaradzki | Dec. 28, 1915 |
| 1,364,847 | Stratton | Jan. 4, 1921 |
| 1,479,576 | Anderson | Jan. 1, 1924 |
| 1,815,398 | Colman | July 21, 1931 |
| 2,259,330 | Snyder | Oct. 14, 1941 |
| 2,320,419 | Ellis et al. | June 1, 1943 |